Feb. 22, 1944.   B. S. ELLEFSON   2,342,609
MANUFACTURE OF GLASS HEADERS FOR ELECTRON TUBES AND THE LIKE
Filed Nov. 12, 1940   3 Sheets-Sheet 1

Bennett S. Ellefson
INVENTOR.
BY John J. Rogan

Feb. 22, 1944.  B. S. ELLEFSON  2,342,609
MANUFACTURE OF GLASS HEADERS FOR ELECTRON TUBES AND THE LIKE
Filed Nov. 12, 1940  3 Sheets-Sheet 2

Bennett S. Ellefson
INVENTOR.
BY John J. Rogan

Feb. 22, 1944.   B. S. ELLEFSON   2,342,609
MANUFACTURE OF GLASS HEADERS FOR ELECTRON TUBES AND THE LIKE
Filed Nov. 12, 1940   3 Sheets-Sheet 3
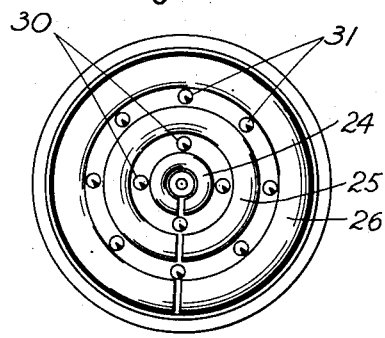
Fig. 7.
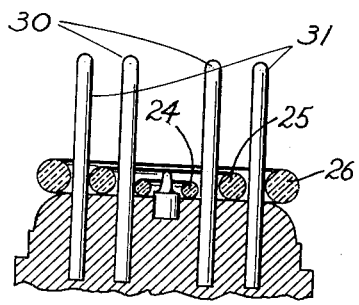
Fig. 6.
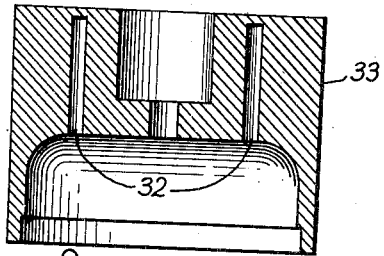
Fig. 8.
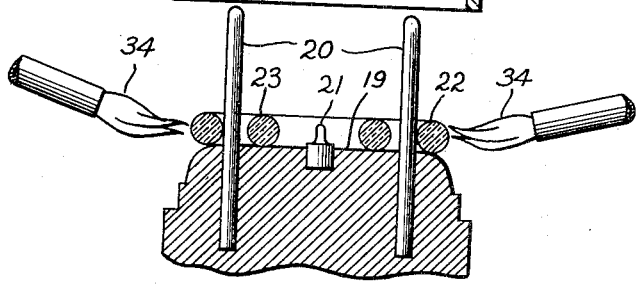
Bennett S. Ellefson
INVENTOR.
BY John J. Rogan Patented Feb. 22, 1944

2,342,609

UNITED STATES PATENT OFFICE 2,342,609

MANUFACTURE OF GLASS HEADERS FOR ELECTRON TUBES AND THE LIKE

Bennett S. Ellefson, Emporium, Pa., assignor to Sylvania Electric Products Inc., a corporation of Massachusetts Application November 12, 1940, Serial No. 365,198

2 Claims. (Cl. 49—78)

This invention refers to glass articles and in particular to a method of making glass headers such as those used in radio tubes and similar articles.

It is a principal object of the invention to devise a method for making disc and cup-shaped glass headers with a number of vacuum tight sealed-in rigid metal leads.

A feature of the invention refers to the preparation of the glass parts to be used for making glass headers.

According to one feature of the invention, the glass blanks are made from a semi-finished material of a nature similar to glass tubing which can be prepared in a simple way but which has a form better adapted than glass tubing for the purpose of making headers.

The hot glass is drawn continuously from the surface of a suitable melt into a plastic, viscous, ropy rod or cane by an upward pull applied to it by a small piece of previously cooled and solidified glass from the same melt which is wound over a mandrel on which a coil is formed from the ropy cane.

The speed with which the ropy glass is pulled out from the melt, its initial temperature and the composition of the glass, determine the diameter of the cane while it is formed into the glass coil on the mandrel. The mandrel may be made of graphite, or of any alloy which can be used for making molding dies for glass.

The solid glass coil is taken off the mandrel in convenient lengths and divided into single turns which may be used directly for forming glass headers and simultaneously sealing the pin leads and the tubulation to them.

Fig. 2a is a sectional view of Fig. 2 along the line 2a—2a.

Figure 4:
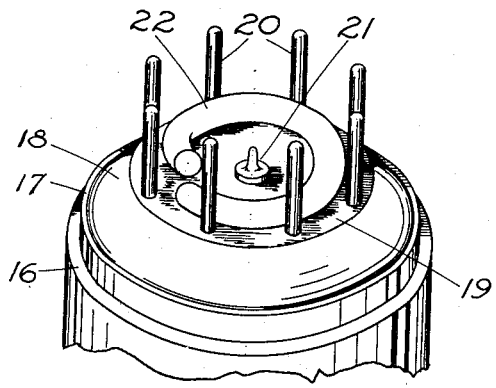
Figure 5:
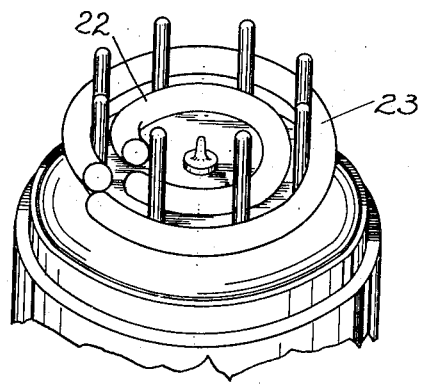

Figs. 4 and 5 demonstrate the way the two single turns of two coils are placed into the molding die for forming and sealing the header.

Figure 4A:
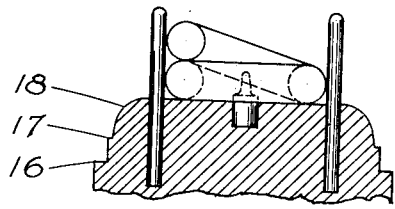
Figure 5A:
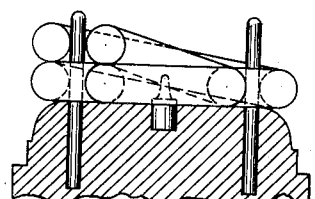

Figs. 4a and 5a are sectional views of Figs. 4 and 5 respectively.

Fig. 6 is a view of the glass molding dies and heating arrangements therefor.

Figs. 7 and 8 respectively are cross-sectional and plan views illustrating a modified method of forming a header according to the invention.

Figure 1:
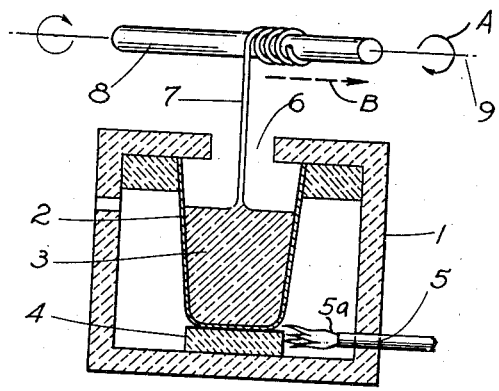
Fig. 1 shows a cross section of the crucible and furnace from which the hot glass cane is pulled over a mandrel on which it is wound up continuously.

Referring to Fig. 1, there is shown a furnace 1 of any well-known construction adapted to receive a crucible 2 containing the prepared glass melt or batch 3 as described hereinabove. Preferably the crucible is seated on a fire-brick 4 which is heated by a suitable gas jet 5a passing through the opening 5. The top wall of the furnace has an opening 6 through which passes the "pull" 7 in the form of a molten highly viscous glass rod which can be drawn from the melt 3 by immersing the end of a previously cooled and solidified glass rod or cane made from the same melt, and pulling the said rod to form the viscous "pull" 7 of sufficient length so that the latter can be given one or more starting turns around the forming mandrel which is rotated at a predetermined speed in the direction of the arrow. Mandrel 8 is rotated preferably at uniform speed around the axis 9 as indicated by arrow A but is not moved along said axis.

Figure 3:
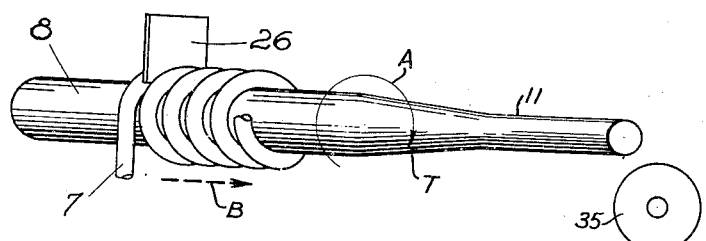
Fig. 3 illustrates a detail of one step in the method of winding the coil.

In order to solidify the successive turns as they are coiled around the mandrel, and in order to give the turns the proper pitch, preferably the mandrel is water-cooled or air-cooled. This cooling of the mandrel also prevents adherence of the molten glass thereto during rotation thereof. This cooling effect is designed so that each coil is cooled to at least a certain amount of rigidity during the period of time corresponding to about one complete turn of the mandrel. Advantage is taken of this solidification of the solidifying coils to cause the latter to be fed longitudinally along the mandrel as indicated by the dotted arrow B. For this purpose there is provided adjacent the mandrel a thin plate 26 (Fig. 3) which can be designed as to thickness and can be placed at such an angle with respect to the axis of mandrel 8 so that in conjunction with the rate of cooling of the viscous coils and the rate of rotation of mandrel the desired pitch and shape of the final solidified coils can be controlled. Preferably the first few turns of the coiled glass are formed around the mandrel by hand and in cooperation with plate 26. The number of initial or starting turns must be large enough to insure an appropriate rigidity to the hand wound turns so that subsequently as the succeeding turns are formed by rotation of the mandrel the hand wound turns cooperate in the nature of a lead-screw with plate 26 to cause them to move bodily as a whole in the direction of the dotted arrow B (Figs. 1 and 3).

Figure 2:
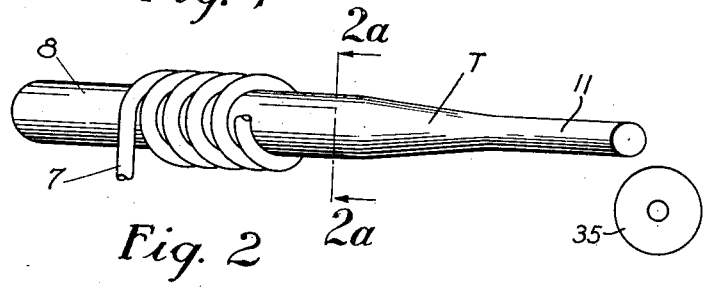
Fig. 2 shows a perspective view of a section of glass coil wound on the mandrel.
Figure 2A:
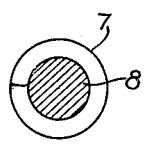

When the "pull" 7 first comes in contact with the mandrel 8 after leaving the furnace 1, it is so plastic that it completely takes the shape of the mandrel periphery. After about one complete turn of the mandrel the coil turn becomes rigid enough so that it takes up the torque of the mandrel and executes the motion along the length of the mandrel and at the same time it is sufficiently rigid to overcome gravity which tends to flatten the cross section. In order to insure that a positive drive is conveyed from the mandrel to each viscous turn as it is being formed the mandrel is preferably formed with two sections, namely a forming section and a rigid coil receiving section, indicated respectively in Fig. 2 by the numerals 8, 11 and an intervening transition section T. The forming section 8 is larger in cross section than the receiving section 11. The coil receiving section 11 may be circular in cross section, it being understood that the two sections 8 and 11 gradually and smoothly merge at the transition region T.

In the event the forming section of the mandrel is to be water-cooled, it may be hollow and provided with a water inlet tube. If air-cooling is desired the tapered part of the forming section can be perforated and a supply of cooling air is forced through the bore of the mandrel. The cooling air then emerges radially outward through the perforations. In either case the outer surface of the mandrel must be smooth enough to allow the formed glass coils to slide lengthwise along it, the cooling of the mandrel preventing any accidental adherence of the coil thereto. The taper of the forming mandrel is so chosen that the contraction of the glass coil during its passage along the cooled mandrel keeps the coil just tight enough to insure the transfer of the torque from the mandrel to the coil without producing undue friction against the axial movement of the coil. As the hardened glass helix reaches the end 11 of the mandrel, it engages a knife-edge rotating wheel 35 which scratches or nicks each individual turn which can be easily broken off from adjacent turns.

Referring to Figs. 4, 4a, 5, 5a, and 6 there is shown a typical header forming die arrangement using the inner and outer glass coils or rings produced by the foregoing described method. The male part of the die is shown in Figs. 4, 4a, 5 and 5a and is formed with two stepped cornered shoulders 16, 17, and a rounded shoulder 18. The female part of the die is shown in the upper portion of Fig. 6. The flat upper face 19 is provided with a series of recesses arranged in the path of a circle or polygon to receive slidably the lead-pins 20. Preferably the face 19 has a central pointed or tapered projection 21 for forming a rudimentary exhaust tubulation. A glass coil 22 of approximately the same outer diameter as the circle circumscribed by the inner margins of the lead pins, is dropped in place as shown in Figs. 4 and 4a. Then another glass coil 23 is dropped around the pins as shown in Figs. 5 and 5a. A complementary female die 33 (Fig. 6) with openings 32 to receive the projecting pins 20 is placed over the assembly of Figs. 5 and 5a and the glass coils 22 and 23 are heated to approximately 900° C. by burners 34 as shown in Fig. 6, rendering them plastic whereupon the two parts of the die are subjected to pressure thus forming a substantially cup-shaped header with the pins 20 rigidly fastened therein with portions extending from opposite sides of the header as shown for example in U. S. Design Patent No. 132,858.

The formed header may then be annealed and removed from the die whereupon it is ready to receive any suitable electrode assembly such as disclosed in U. S. Patent No. 2,250,184 to form a mount. This mount can then be sealed to a glass bulb to form a complete tube which is thereupon subjected to an appropriate evacuation schedule well-known in the radio tube industry. After evacuation the exhaust tubulation is tipped off and the completed envelope may have a metal shielding base attached thereto as shown in U. S. Patent No. 2,250,184.

While in the foregoing description the invention has been illustrated in connection with a header for an electron tube, it will be understood that the invention is equally well applicable to headers for lamp bulbs and the like, or in connection with any device which is required to have one or more metal inserts sealed therethrough so as to be rigidly united to the glass. Furthermore, while the invention finds its immediate practical utility in connection with electron tube headers of the rigid pronged or rigid lead-in type, it will be understood that the invention is also applicable where the lead-ins are in the form of thin flexible wires. Furthermore, while the header is disclosed as constituting the closing member of an evacuated bulb, it will be understood that it can be used as a contact base for attachment to an otherwise completed lamp or bulb. Various other changes may be made without departing from the spirit and scope of the invention.

It will be clear from the foregoing description that the glass blanks may be used either as single turn coils or as plural-turn coils, depending upon the thickness that is desired in the finished header. Furthermore, instead of forming the glass header from a single inner coil and a single outer coil, a plurality of nested coils 24, 25, 26 may be used both interiorly and exteriorly of the contact pins. In this latter case it is possible to use more than one circle of contact pins. Thus the pins may be arranged in circular sets with one set on a wider circle than the other set, and nested glass coils may be used as illustrated diagrammatically in Figs. 7 and 8 wherein one set of pins is designated 30, and the other set is designated 31. Thus the header may be considered as formed of a series of pins transversely sandwiched between adjacent glass coils 24, 25, 26. Thus it becomes possible to make headers of any desired diameter and number of pins. Likewise, while it has been mentioned that the header may be formed from glass coils of substantially the same cross-sectional diameter, it will be understood that one or more coils may be of larger cross-sectional diameter than the rest depending upon the contour that is desired in the finished glass header. Furthermore, instead of employing glass coils made from blanks of substantially the same softness characteristics e. g., so-called "soft" glasses, it will be understood that the coils may have different degrees of softness or hardness so as to form a graded softness or hardness in different parts of the glass header. Thus, relatively "hard" glass coils may be used where the rigid metal prongs are to be sealed and a soft glass coil may be used at the center to enable a soft glass exhaust tubulation or the like to be readily sealed thereto. Likewise, the outermost coil may be of a different hardness characteristic in the event that the glass header is to be sealed directly to a metal bulb or the like.

Subject matter disclosed in this application and not claimed herein is disclosed and claimed in copending application Serial No. 426,970, filed January 16, 1942.

What I claim is:

1. The method of making a substantially flattened glass header for electron tubes and the like which includes, forming a molten glass mass into a plurality of rigid glass coils by directly withdrawing and winding a viscous glass pull from said molten glass mass, positioning a plurality of said coils substantially coaxially in a mold, and heating said coils in said mold and subjecting them to molding pressure to form said flattened glass member.

2. The method of making a substantially flattened glass member which includes, directly withdrawing from a molten glass mass a plurality of viscous pulls winding said pulls while in a viscous condition to form a plurality of rigid glass helices of different diameters, severing individual coils from each helix, positioning said severed coils in substantially nested relation and heating to render them plastic, and molding the plastic coils to form said flattened glass member.

BENNETT S. ELLEFSON.